(12) United States Patent
Morovic et al.

(10) Patent No.: US 10,574,853 B2
(45) Date of Patent: Feb. 25, 2020

(54) EMBEDDING A PATTERN IN OUTPUT CONTENT

(71) Applicant: Hewlett-Packard Development Company, L.P., Houston, TX (US)

(72) Inventors: Peter Morovic, Sant Cugat del Valles (ES); Jan Morovic, Colchester (GB); Matthew D. Gaubatz, Seattle, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/564,409

(22) PCT Filed: Jul. 30, 2015

(86) PCT No.: PCT/US2015/043000
§ 371 (c)(1),
(2) Date: Oct. 4, 2017

(87) PCT Pub. No.: WO2017/019105
PCT Pub. Date: Feb. 2, 2017

(65) Prior Publication Data
US 2018/0139349 A1 May 17, 2018

(51) Int. Cl.
*H04N 1/32* (2006.01)
*H04N 1/405* (2006.01)
(Continued)

(52) U.S. Cl.
CPC ..... *H04N 1/32256* (2013.01); *H04N 1/32149* (2013.01); *H04N 1/405* (2013.01);
(Continued)

(58) Field of Classification Search
CPC ............ H04N 1/32256; H04N 1/4052; H04N 1/32149; H04N 1/405; H04N 2201/3236; B33Y 50/00; G06K 15/181
See application file for complete search history.

(56) References Cited

U.S. PATENT DOCUMENTS 6,995,873 B1 * 2/2006 Mitchell .............. H04N 1/4055
358/3.04
7,991,498 B2 8/2011 Kritchman
(Continued)

FOREIGN PATENT DOCUMENTS

| EP | 1833238 | 9/2007 |
|---|---|---|
| WO | WO-2006116270 | 11/2006 |
| WO | WO-2014143980 | 9/2014 |

OTHER PUBLICATIONS

Wonjoon Cho, et al., "A Dithering Algorithm for Local Composition Control with Three-Dimensional Printing", Dec. 21, 2001, pp. 26. http://www.mit.edu/~tdp/info-flow/publications/dither_algo.pdf.
(Continued)

*Primary Examiner* — Christopher Wait
(74) *Attorney, Agent, or Firm* — HP Inc. Patent Department (57) ABSTRACT

Certain examples described herein relate to the embedding a pattern in an output content having at least two-dimensions, for example a printed output. Content data having at least two dimensions is processed to generate an array of spatial elements, each spatial element corresponding to a respective location in the output content and comprising a probabilistic distribution for a set of output material compositions. A threshold matrix is generated using pattern data corresponding to a pattern, and the array of spatial elements is halftoned using the threshold matrix. The threshold matrix is generated such that the pattern is embedded in the output content.

15 Claims, 5 Drawing Sheets

(51) Int. Cl.
*G06K 15/02* (2006.01)
*B33Y 50/00* (2015.01)
(52) U.S. Cl.
CPC ............ *H04N 1/4052* (2013.01); *B33Y 50/00* (2014.12); *G06K 15/181* (2013.01); *H04N 2201/3236* (2013.01)

(56) References Cited

U.S. PATENT DOCUMENTS

| | | | |
|---|---|---|---|
| 2009/0067742 A1* | 3/2009 | Lim | G06T 5/003 382/263 |
| 2011/0222081 A1 | 9/2011 | Yi et al. | |
| 2013/0265612 A1* | 10/2013 | Chandu | G06K 15/1881 358/3.06 |
| 2014/0277661 A1 | 9/2014 | Amadio et al. | |
| 2014/0324204 A1 | 10/2014 | Vidimce et al. | |
| 2016/0009119 A1* | 1/2016 | Cape | B42D 25/29 283/72 |

OTHER PUBLICATIONS

International Search Report and Written Opinion dated May 25, 2016, PCT Patent Application No. PCT/US2015/043000, filed Jul. 30, 2015, Korean Intellectual Property Office.

\* cited by examiner

EMBEDDING A PATTERN IN OUTPUT CONTENT

CLAIM FOR PRIORITY

The present application is a national stage filing under 35 U.S.C. § 371 of PCT application number PCT/US2015/043000, having an international filing date of Jul. 30, 2015, the disclosure of which is hereby incorporated by reference in its entirety.

BACKGROUND

Embedding a pattern in output content, such as printed output, is performed for a variety of reasons. For example, security features and anti-counterfeiting patterns, such as watermarks, are used to establish the authenticity of a printed output and to provide anti-copying protection. Alternatively, data bearing patterns such as matrix codes (e.g. barcodes, QR codes and the like) and data-bearing halftones are used to embed data into a printed output.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

This disclosure describes various techniques for producing output content. These techniques include techniques for printing a 2D document and also the production of three-dimensional objects by so-called "3D printing". Further, these techniques also apply to displaying content with a display device.

To produce a printed output, content data for the desired printed output is processed to form control instructions for a printing apparatus. These control instructions can be compatible with the available printing operations that can be performed by the printing apparatus. For example, a printing apparatus has a finite number k of available printing materials (e.g. k equals four for a printing apparatus using cyan, magenta, yellow and black printing liquids) and a finite number L of levels of discrete material formation (e.g. L equals three if at each print location the amount of each printing material that can be deposited corresponds to zero, one or two units). In such a printing apparatus, the content data can be processed using halftoning to generate control data in which there are $L^k$ possible discharge operations for each print location.

The content data is electronic data representative of output content with which a human being can interact. As such, the content data stores data representing at least one physical parameter for each of a plurality of locations in the output content. The content data can correspond to a two-dimensional array of locations, in which the at least one physical parameter stored for each location can represent an optical property of that location such that the content data represents a two-dimensional image. Alternatively, the content data can correspond to a three-dimensional array of locations with the at least one physical parameter stored for each location corresponding to an optical property and/or a mechanical property of that location such that the content data represents a three-dimensional object having a defined appearance and/or mechanical function. The output content may be permanent, such as a printed image or an object formed using 3D printing techniques, or transient, such as an image displayed on an electronic display.

In the halftoning process, error diffusion techniques are generally employed to mitigate the impact of any difference between the source content data and the printed output as a result of the available printing operations being incapable of exact reproduction of the source content data. The error diffusion techniques used in such halftoning processes can complicate matters. For example predictions of the discharge operation performed at a print location based on the source content data can be unreliable. This lack of predictability introduces a challenge when it is desired to introduce a pattern, such as a security feature or a data pattern, into the printed output.

Certain examples described herein enable a pattern to be embedded in a printed output corresponding to content data by generating an array of spatial elements. Each spatial element can correspond to a respective print location and can include a probabilistic distribution for a set of output material compositions. A threshold matrix is generated using pattern data corresponding to the pattern, and the array of spatial elements is processed using the threshold matrix to generate control data for a printing apparatus. In such an arrangement, a single threshold matrix can be employed resulting in a predictable pattern placement.

The pattern data is electronic data representative of a discernible pattern to be formed in output content with which a human being can interact. As such, the pattern data stores data representing at least one physical parameter for each of a plurality of locations in the output content. The pattern data can correspond to a two-dimensional array of locations or a three-dimensional array of locations, in which the at least one physical parameter stored for each location can represent an optical property of that location such that the pattern data corresponds to a two-dimensional image. In this way, the pattern can be viewed using an imaging technique. Instead of or in addition to an optical property, the pattern data can correspond to some other discernible physical property such as a magnetic property.

Figure 1:
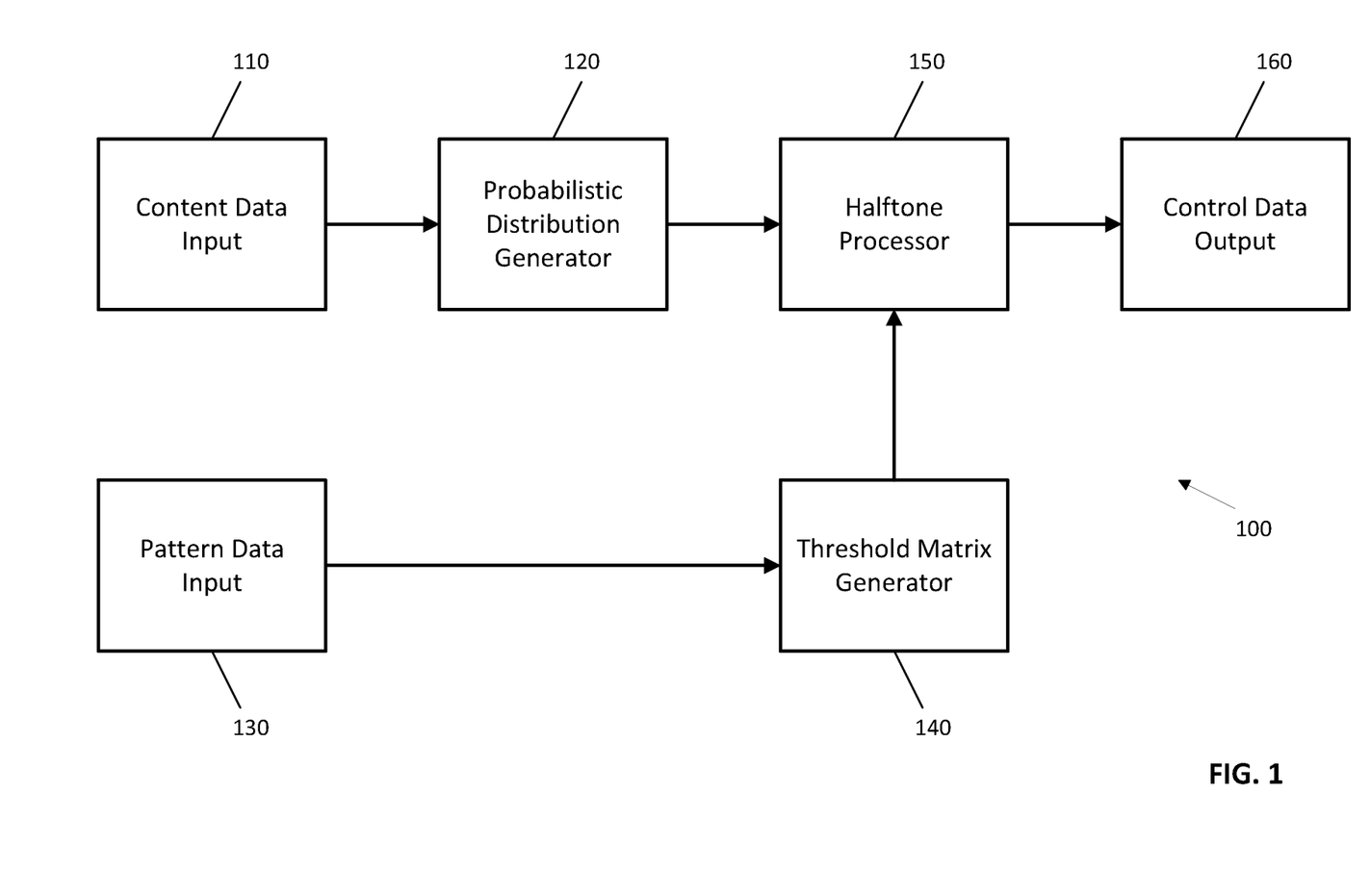
FIG. 1 is a schematic diagram showing the main components of an apparatus for generating control data for a printer in accordance with content data for a printed output and pattern data corresponding to a pattern to be embedded in the printed output according to an example.

FIG. 1 shows an example of an apparatus 100 arranged to generate control data for a two-dimensional printed output in accordance with content data, in which a two-dimensional pattern is embedded in the printed output. As shown in FIG.

1, a content data input 110 is provided that obtains content data. There are many possible sources for the content data. For example, the content data may be generated on a local computer device or downloaded from a remote computer device.

The content data can be defined in any color space and may be a continuous tone image. In contrast, the printed output is determined by the discharge operations available to the printing apparatus. For example, the printing apparatus may have discharge nozzles for discharging cyan, magenta, yellow and black printing liquid (the CMYK system), and each print location in the printed output can correspond to an elemental color (e.g. cyan in the CMYK system) or possibly a composite color (e.g. red equaling magenta plus cyan in the CMYK system). Each of the possible color states for a printing operation is referred to as a Neugebauer primary. Accordingly, if there are k available printing materials and L possible print levels, then there are $L^k$ Neugebauer primaries. For the CMYK system with up to one drop per print location, there are sixteen valid Neugebauer primaries which can be represented by the notation CMYK equals [0 0 0 0] for no drops being printed, [1 0 0 0] for one drop of cyan printing liquid and no drops of magenta, yellow and black printing liquid being printed, and so on to [1 1 1 1] representing one drop of cyan printing liquid, one drop of magenta printing liquid, one drop of yellow printing liquid and one drop of black printing liquid being printed.

The number of colors that are perceptible in the printed output can exceed the number of Neugebauer primaries using spatial averaging techniques. For example, a color that does not directly correspond to one of the Neugebauer primaries can be perceived based on the printing at adjacent print locations of different Neugebauer primaries with an area coverage for each Neugebauer primary being defined by a probabilistic distribution, which can be termed the Neugebauer Primary area coverage or NPac. A color may be represented by an NPac vector, for example [C:0.2, CM:0.3, CY: 0.2, Y: 0.2, W: 0.1] which corresponds to a 20% probability/area coverage of a cyan drop (represented by "0:0.2"), a 30% probability/area coverage of a cyan and magenta drop overprinting (represented by "CM:0.3"), a 20% probability/area coverage of a cyan and yellow drop overprinting (represented by "CY:0.2"), a 20% probability/area coverage of a yellow drop (represented by "Y:0.2") and a 10% possibility of no drop (represented by "W:0.1"). The NPac vector thus corresponds to a probabilistic distribution for a set of output material compositions. In this example, the probabilistic distribution represented by the NPac vector is configured to form a look-up table for an input value 'v', hereafter referred to as the Neugebauer Primary probability distribution. In this way, the NPac vector [C:0.2, CM:0.3, CY: 0.2, Y: 0.2, W: 0.1] discussed above is represented by Table 1.

TABLE 1

Example Neugebauer Primary probability distribution

| Material Composition | Value |
| --- | --- |
| No drop | $0.9 \leq v \leq 1$ |
| Yellow drop | $0.7 \leq v < 0.9$ |
| Cyan and yellow drop overprinting | $0.5 \leq v < 0.7$ |
| Cyan and Magenta drop overprinting | $0.2 \leq v < 0.5$ |
| Cyan drop | $0 \leq v < 0.2$ |

As shown in FIG. 1, the content data is input to a probabilistic distribution generator 120, which processes the content data to generate an array of spatial elements, with each spatial element corresponding to a respective location and having a corresponding Neugebauer Primary probability distribution. The array of spatial elements corresponds to a two-dimensional area defined by two directions, in which each spatial element corresponds to a first position in one of the two directions and a second position in the other of the two directions. As such, the array of spatial elements corresponds to a two-dimensional matrix.

Pattern data corresponding to the pattern for embedding in the printed output is obtained at the pattern data input 130. The pattern data may be obtained from the same source as the content data, or alternatively may be obtained from a different source from that of the content data. The content data input 110 and the pattern data input 130 may correspond to different hardware components or may alternatively correspond to different software components.

The pattern data is input to a threshold matrix generator 140, which generates an N×N threshold matrix. In examples, N has a value of at least 512, and may be a power of two (e.g. 512, 1024, etc.). In halftoning, a threshold matrix is used to transform input data having continuous tones into output data having a plurality of discrete tones corresponding to the available print operations.

In this example, the threshold matrix generator 140 combines a pattern matrix corresponding to the pattern data with a halftoning matrix to form an N×N threshold matrix for which each matrix element has a multi-bit value. The halftone matrix H is an N×N matrix having tone values that are well-spread and uniformly distributed. Each tone value generally has the same frequency and the spatial distribution is generally well spread. Examples of halftone matrices include white-noise halftone matrices, blue noise halftone matrices, amplitude modulated (AM) halftone matrices and clustered-dot patterns.

The array of spatial elements output by the probabilistic distribution generator 120 is input to a halftone processor 150. The halftone processor 150 splits the array of spatial elements into a plurality of N×N sub-arrays such that each N×N sub-array corresponds to an N×N matrix. The N×N threshold matrix output by the threshold matrix generator 140 is also input to the halftone processor 150. The value of each matrix element of the N×N threshold matrix is scaled to a value between 0 and 1 and then used as an input value 'v' for the Neugebauer primary probability distribution for the corresponding matrix element in each of the sub-arrays of spatial elements to generate control data. For example, if a matrix element of an N×N matrix of spatial elements has a corresponding Neugebauer Primary probability distribution as set out in FIG. 1 and the corresponding matrix element of the threshold matrix has a scaled value of 0.65, then control data for overprinting a cyan drop and a yellow drop is output for the corresponding print location, whereas if the scaled value is 0.25 then control data for overprinting a cyan drop and a magenta drop is output.

A control data output 160 supplies the control data, either directly or indirectly, to drive circuitry (not shown) for a printhead in a print apparatus. In response to receiving the control data, the drive circuitry outputs drive signals to produce a printed output corresponding to the content data with an embedded pattern corresponding to the pattern data.

Figure 2:
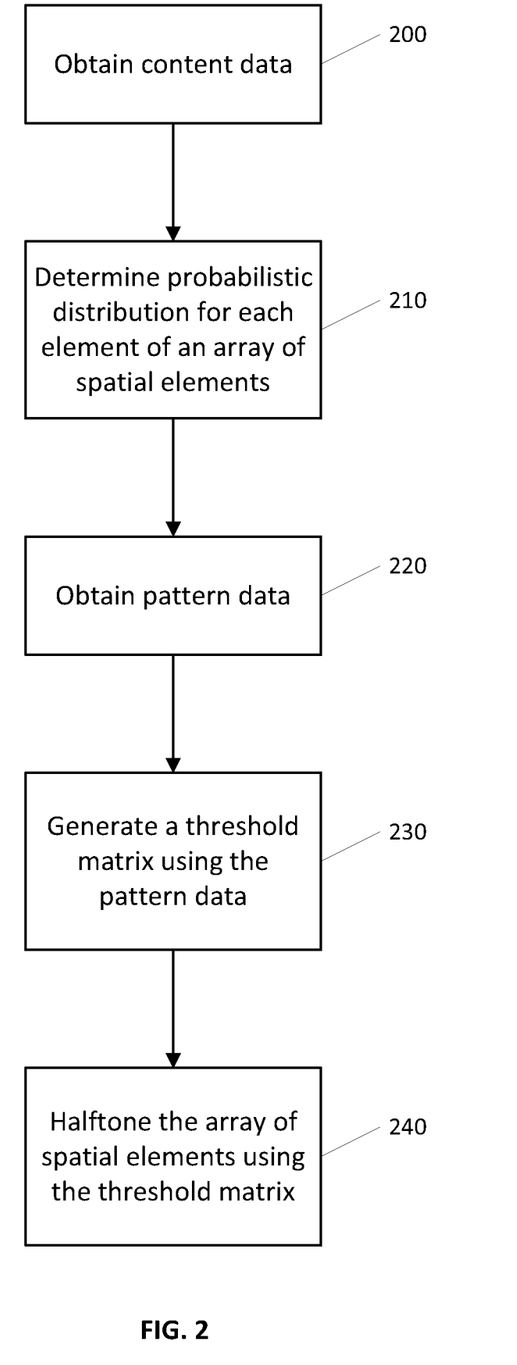
FIG. 2 is a flow diagram showing a method for generating control data for a printer in accordance with content data for a printed output and pattern data corresponding to a pattern to be embedded in the printed output according to an example.

The operations performed by the apparatus 100 are summarized in FIG. 2. The apparatus 100, at 200, obtains content data for a printed output and determines, at 210, a probabilistic distribution for each element of an array of spatial elements associated with the content data, each spatial element corresponding to a respective location in the printed output and comprising a probabilistic distribution for a set of output material compositions. The apparatus 100 also obtains, at 220, pattern data corresponding to a pattern for embedding in the printed output. The apparatus 100 generates, at 230, a threshold matrix using the pattern data and then halftones, at 240, the array of spatial elements using the threshold matrix.

The pattern data is used when forming the threshold matrix in such a way that the pattern corresponding to the pattern data is embedded in the printed output. Various techniques for generating the threshold matrix using the pattern data will now be described with reference to FIGS. 3 to 5.

Figure 3:
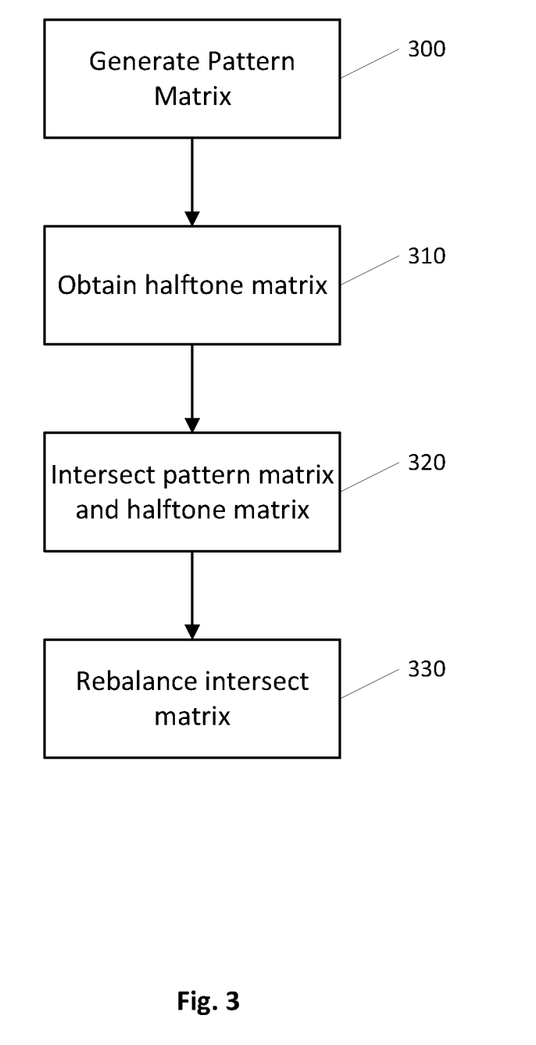
FIG. 3 is a flow diagram showing a method of inserting pattern data into a threshold matrix for halftoning according to an example.

In one example, as shown in FIG. 3, the pattern data is processed to generate, at 300, an N×N pattern matrix P, i.e. a matrix matching the size of the eventual threshold matrix. If the pattern data does not correspond directly to an N×N pattern matrix P, then various operations can be performed on the pattern data to generate the N×N pattern matrix P, including regularly repeating the pattern to tile over an area corresponding to the N×N pattern matrix P, irregularly repeating the pattern (i.e. including shifts or rotations of the pattern in each repeat) to tile over an area corresponding to the N×N pattern matrix P, or scaling a pattern to fill an area corresponding to the N×N pattern matrix P. The pattern may be in the form of a spatial arrangement of single bit (i.e. binary) data or a spatial arrangement of multi-bit data. The values of the pattern data are scaled when forming the pattern matrix to be a multi-bit encoded matrix, for example a 12-bit encoded matrix.

In this example, a halftone matrix H is obtained at 310. The continuous tone values of the halftone matrix H have multi-bit values and in this example the number of bits in each value in the pattern matrix P is selected to match the number of bits in each value of the halftone matrix H, for example twelve bits.

As shown in FIG. 3, the halftone matrix H and the pattern matrix P are intersected, at 320, to form an N×N intersected matrix. The intersection of the halftone matrix H and the pattern matrix P involves the values of the pattern matrix P taking precedence over those of the halftone matrix H. Effectively, for any matrix element having a non-zero value in the pattern matrix P, the corresponding matrix element of the halftone matrix H is replaced by that non-zero value in the pattern matrix P to form the intersected matrix.

In this example, the intersected matrix is rebalanced, at 330, to generate the threshold matrix. This rebalancing involves improving the uniformity of the distribution of values while preserving the values of the matrix elements corresponding to the pattern matrix P. There is, therefore, a trade-off between preserving the pattern data and making the distribution of values more uniform. In another example, no rebalancing is performed.

Figure 4:
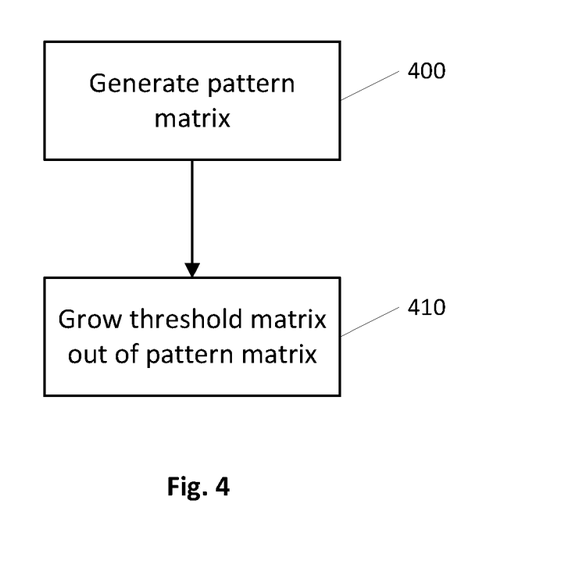
FIG. 4 is a flow diagram showing a method of inserting pattern data into a threshold matrix for halftoning according to another example.

Other examples do not involve the modification of an existing halftone matrix H. For example, FIG. 4 shows the steps performed in an alternative example in which following generation of the pattern matrix P, at 400, the threshold matrix is "grown", at 410, out of the pattern matrix P. This growth of the threshold matrix can be performed by using the pattern matrix P as the seed data for an algorithm such as the void and cluster algorithm. Seed data refers to the data that is input to an algorithm that performs an iterative set of operations, with the output of one operation forming the input of the next operation. In the example of the void and cluster algorithm, the seed data is used as input data for a sequence of void and cluster operations that result in a threshold matrix suitable for halftoning. In this approach, a first void and cluster operation can be performed on the peak values of the pattern matrix P, and then further void and cluster operations can iteratively be performed until a threshold matrix suitable for halftoning is achieved. Alternatively, the peak values can be used as the centers of clusters in a cluster-dot operation, with the non-peak voids being filled around the peak clusters.

Figure 5:
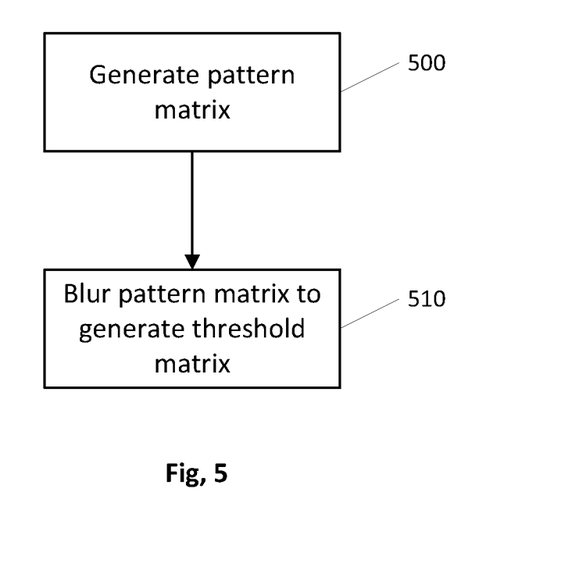
FIG. 5 is a flow diagram showing a method of inserting pattern data into a threshold matrix for halftoning according to a further example.

FIG. 5 shows the steps performed in a further example in which a threshold matrix is formed by blurring the pattern matrix. The pattern matrix P is generated, at 500, and then blurred, at 510, to generate the threshold matrix. Such blurring involves applying a filter, such as a Gaussian blur filter, to the pattern matrix to improve the value distribution over that of the pattern matrix P.

In all the examples discussed above, the threshold matrix preserves the values and locations of the pattern matrix P while the remaining values are determined so as to improve the uniformity of the value distribution. By preserving the values and the locations of the pattern matrix P within the threshold matrix, the pattern corresponding to the pattern data is preserved in the printed output.

Although the examples discussed above have related to 2D printing operations, the same techniques can be applied to 3D printing operations. For a 3D printing operation, a material volume coverage representation is generated in place of a Neugebauer primary area coverage. The material volume coverage representation can be in the form of a material volume coverage (MVoc) vector, which corresponds to a probability distribution. To explain the components of a material volume coverage vector, a simple example may be considered. In this simple example, an apparatus is arranged to use two materials, M1 and M2, to generate a three-dimensional object. These materials may be fluid build materials that are deposited on a substrate or platen, e.g. excreted or ejected molten polymers, or they may comprise two deposit-able color agents that are deposited on one or more layers of powdered build material. In the former case, in a produced three-dimensional object, each "material" may correspond to a solidified portion of excreted or ejected polymer. Each "material" is deposit-able by an additive manufacturing apparatus to generate a defined volume (e.g. at the production resolution) of an output three-dimensional object.

In this simple example, if the additive manufacturing apparatus is arranged to deposit discrete amounts of each material, e.g. in binary deposits, there are four different material combination states: a first state for the deposit of M1 without M2; a second state for the deposit of M2 without M1; a third state for the deposit of both M1 and M2, e.g. M2 deposited over M1 or vice versa; and a fourth state for an absence of both M1 and M2, e.g. "blank" (Z). In this case, the material volume coverage vector has four vector components: [M1, M2, M1M2, Z]. In the case of the last vector component, "blank" or "Z" may represent "empty" or an absence of materials in a processed layer, e.g. if agents are deposited on layers of build material this may denote an absence of build material for the processed layer, even though the build material may not be removed until the complete object has been produced.

This approach may be contrasted with a comparative method that assigns material proportions to each voxel. In these comparative methods, a percentage of each of materials M1 and M2 are defined for each voxel, e.g. [M1, M2] wherein the vector is normalized to 1 (for ranges of 0-1) or 100% (for percentage ranges). In this comparative case, there is no consideration of the combination of M1 and M2, nor is there a consideration of the absence of both materials.

As such these comparative methods do not consider material combinations; without considering the material combinations the defined material proportions cannot be linearly combined and exhibit non-linearities that make processing problematic. Additionally, the definition and use of material combinations provide more accurate and exact control of the materials that are used. For example, particular values for a given percentage of each of materials M1 and M2 as defined for a voxel, e.g. [M1=0.5, M2=0.5], may be controlled using a plurality for material volume coverage vector values, e.g. various combinations of M1, M2 and M1M2. Defining the absence of any material ("Z") as a particular material combination also further facilitates this control.

More generally, for an additive manufacturing apparatus having k available materials and L discrete deposit states for said materials, a material volume coverage vector comprises $L^k$ vector components, each vector component representing an available material/deposit state combination, including separate and joined use and an absence of any material. Or in other words, the vector components of a material volume coverage vector represent all materials available to an apparatus and their combinations; they are an enumeration of possible build or deposit states available to the apparatus. The vector components may be considered analogous to the concept of Neugebauer Primaries in color printing. In this analogy, each vector component may be considered to comprise a volume coverage of a "material primary". As such the material volume coverage vector has a dimensionality representative of these states and contains the volume coverages (e.g. probabilities) associated with each state. Or in other words, a material volume coverage vector (indicated in the Figures as MVoc) comprises weighted combinations or probabilities of material primaries. This approach compares to the comparative methods discussed above that have k vector components.

The processing performed to generate control data for 3D printing is analogous to that described above with respect to 2D printing, but using three-dimensional arrays of spatial elements and matrices (e.g. pattern matrix, halftone matrix, threshold matrix).

The same techniques can be applied to displaying content on a display device. In an example, the image data for display by the display device has continuous tone values, and an imaging pipeline is used to convert the continuous tone values into control signals for the available discrete display states of the display device. Using the techniques of the present invention, the imaging pipeline can embed pattern data into the displayed image by generating an array of spatial elements associated with the image data, each spatial element corresponding to a respective location and comprising a probabilistic distribution for a set of output states, generating a threshold matrix using the pattern data and then performing a halftoning operation using the generated threshold matrix to generate control data for the display device.

Figure 6:
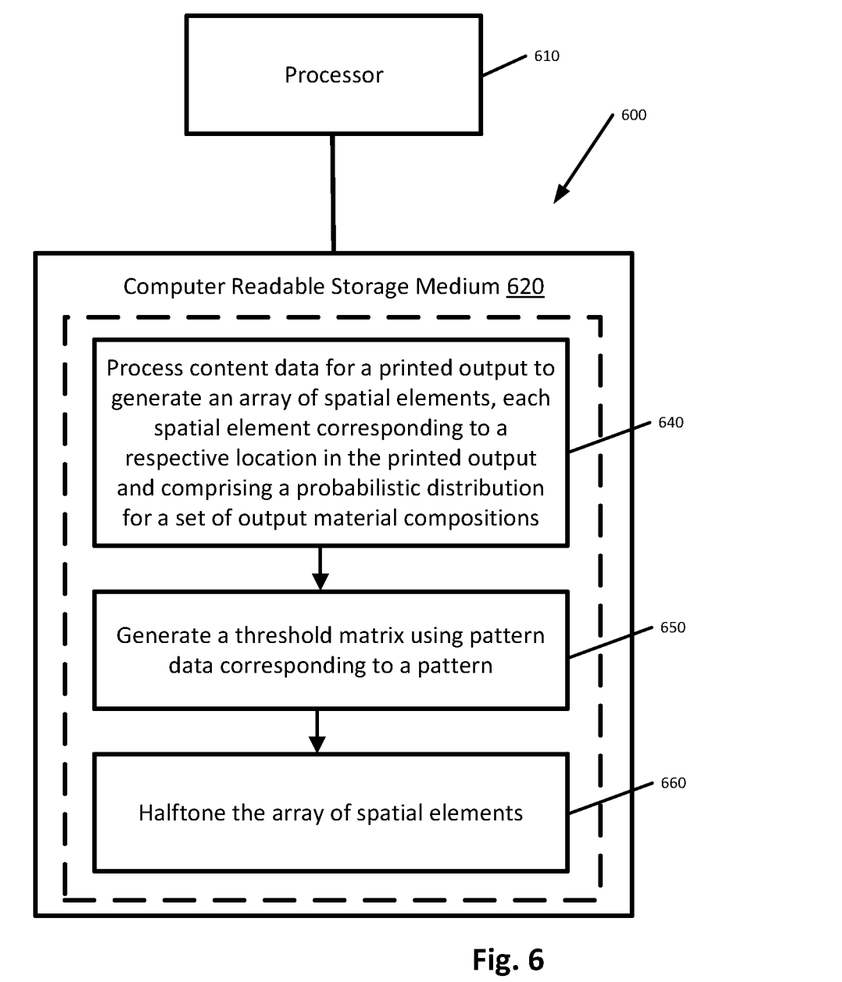
FIG. 6 is a schematic diagram showing a computing device for generating control data for a printer according to an example.

Certain system components and methods described herein may be implemented by way of non-transitory computer program code that is storable on a non-transitory storage medium. FIG. 6 shows an example 600 of a print control system 600 comprising at least one processor 610 arranged to retrieve data from a computer readable storage medium 620. The computer-readable storage medium 620 comprises a set of computer-readable instructions 630 stored thereon. The set of computer readable instructions are arranged to cause the at least one processor to perform a series of actions. Instruction 640 is arranged to process content data for a printed output to generate an array of spatial elements, each spatial element corresponding to a respective location in the printed output and comprising a probabilistic distribution for a set of output material compositions. Instruction 650 is arranged to initiate the generation of a threshold matrix using pattern data corresponding to a pattern. Instruction 660 is arranged to halftone the array of spatial elements using the threshold matrix, which is generated so that the pattern is embedded in the printed output.

The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

The preceding description has been presented to illustrate and describe examples of the principles described. This description is not intended to be exhaustive or to limit these principles to any precise form disclosed. Many modifications and variations are possible in light of the above teaching. Techniques, functions and approaches described in relation to one example may be used in other described examples, e.g. by applying relevant portions of that disclosure.

What is claimed is:

1. A method of embedding a pattern in output content having
at least two-dimensions comprising:
obtaining content data, the content data storing data representing at least one physical parameter for each of a plurality of locations in the output content;
generating an array of spatial elements associated with the content data, each spatial element corresponding to a respective location and comprising a probabilistic distribution for a set of output material compositions for the respective location;
obtaining pattern data corresponding to the pattern to be embedded in the output content;
generating a threshold matrix using the pattern data; and
halftoning the array of spatial elements using the threshold matrix to generate control data for the output content to embed the pattern in the output content to be visible with the output content.

2. The method of claim 1, wherein generating the threshold matrix comprises combining the pattern data and a halftone matrix.

3. The method of claim 2, wherein generating the threshold matrix comprises:
forming a pattern matrix from the pattern data, the pattern matrix having a size and a scale matching a size and a scale of the halftone matrix; and
intersecting the pattern matrix and the halftone matrix such that values of the pattern matrix take precedence when larger than corresponding values of the halftone matrix.

4. The method of claim 3, further comprising rebalancing a matrix resulting from the intersection of the pattern matrix and the halftone matrix to distribute the values of the pattern matrix more uniformly.

5. The method of claim 1, wherein the generation of the threshold matrix comprises:
forming a pattern matrix from the pattern data; and
growing a halftone matrix using the pattern data as seed data.

6. The method of claim 5, wherein growing the halftone matrix comprises performing a void-and-cluster operation using the seed data.

7. The method of claim 1, wherein the generation of the threshold matrix comprises:
forming a pattern matrix from the pattern data;
blurring the pattern matrix; and
generating the threshold matrix by combining the blurred pattern matrix and a halftone matrix.

8. The method of claim 7, wherein the blurring of the pattern matrix comprises applying a Gaussian blur filter to the pattern matrix.

9. A print apparatus comprising:
a processor; and
a computer readable storage medium on which is stored instructions that when executed by the processor, cause the processor to:
receive content data for a printed output;
generate, for each spatial element in an array of spatial elements, a probabilistic distribution for a set of output material compositions, wherein each spatial element corresponds to a respective location in the printed output, and wherein the output material compositions comprise printing materials of multiple colors;
receive pattern data corresponding to a pattern to be embedded in the printed output;
generate a threshold matrix using the pattern data and a halftone matrix, the pattern data differing from the halftone matrix; and
process the probabilistic distribution for each spatial element using a corresponding element of the threshold matrix,
wherein to generate the threshold matrix, the instructions are to cause the processor to embed the pattern in the printed output, wherein the pattern is visible with the printed output.

10. The print apparatus according to claim 9, wherein the instructions are further to cause the processor to generate a pattern matrix corresponding to the pattern data, and to intersect the pattern matrix and the halftone matrix to generate the threshold matrix.

11. The print apparatus according to claim 9, wherein the instructions are further to cause the processor to generate the halftone matrix using the pattern data as seed data.

12. The print apparatus according to claim 9, wherein the instructions are further to cause the processor to generate a pattern matrix corresponding to the pattern data, to apply a blurring filter to the pattern matrix, and to generate the threshold matrix by combining the blurred pattern matrix and the halftone matrix.

13. The print apparatus according to claim 9, wherein the print apparatus is a 2D printer.

14. The print apparatus according to claim 9, wherein the print apparatus is a 3D printer.

15. A non-transitory computer-readable storage medium comprising a set of computer-readable instructions stored thereon, which, when executed by a processor, cause the processor to:
process content data for output content having at least two dimensions to generate an array of spatial elements, each spatial element corresponding to a respective location in the output content and comprising a probabilistic distribution for a set of output material compositions for the respective location;
generate a threshold matrix using pattern data corresponding to a pattern to be embedded in the output content, wherein the pattern is visible with the output content; and
halftone the array of spatial elements using the threshold matrix.

* * * * *